(12) United States Patent
Fascinato et al.

(10) Patent No.: US 6,997,046 B2
(45) Date of Patent: Feb. 14, 2006

(54) METHOD AND APPARATUS FOR FIXTURED WAX AND TRACE

(75) Inventors: Jason Brian Fascinato, Cincinnati, OH (US); Timothy Michael Martinkovic, Hamilton, OH (US); Jeffrey Stanley Keller, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 73 days.

(21) Appl. No.: 10/632,287

(22) Filed: Aug. 1, 2003

(65) Prior Publication Data

US 2005/0022410 A1 Feb. 3, 2005

(51) Int. Cl.
G01B 5/20 (2006.01)
G01B 121/20 (2006.01)
G01B 3/14 (2006.01)

(52) U.S. Cl. .............................. 73/104; 73/105; 33/551; 33/561.2

(58) Field of Classification Search ................. 73/1.89, 73/104, 105; 33/551, 561.2
See application file for complete search history.

(56) References Cited

U.S. PATENT DOCUMENTS

| | | | |
|---|---|---|---|
| 2,601,703 A * | 7/1952 | Sawyer ....................... 264/40.1 |
| 4,043,187 A * | 8/1977 | Tomomatsu .................. 73/105 |
| 4,255,862 A | 3/1981 | Nakamura |
| 4,618,465 A | 10/1986 | Parks |
| 4,951,497 A * | 8/1990 | Gilibert ........................ 73/105 |
| 5,090,811 A | 2/1992 | Donaldson |
| 5,344,302 A * | 9/1994 | Beehler et al. .............. 425/178 |
| 5,500,737 A | 3/1996 | Donaldson et al. |
| 5,546,797 A * | 8/1996 | Dutta et al. ................ 73/150 A |
| 5,642,293 A | 6/1997 | Manthey et al. |
| 5,684,573 A | 11/1997 | Khazaka et al. |
| 6,019,669 A * | 2/2000 | Kitao et al. .................... 451/43 |
| 6,090,027 A * | 7/2000 | Brinkman ..................... 493/54 |
| 6,110,401 A | 8/2000 | Lee et al. |
| 6,175,415 B1 | 1/2001 | Pietrzak et al. |
| 6,205,240 B1 | 3/2001 | Pietrzak et al. |
| 6,314,798 B2 * | 11/2001 | Nomura et al. ................. 73/81 |

* cited by examiner

Primary Examiner—Daniel S. Larkin
(74) Attorney, Agent, or Firm—Donald E. Hasse; Hasse & Nesbitt LLC; John B. Woodard

(57) ABSTRACT

A method and apparatus is provided for making impressions of edges and profiling the edges using a profiling machine. The apparatus allows the impressionable material used for forming the impression to be held in a fixed position while the impression of the edge is formed, and then allows the impression to be withdrawn in a manner that leaves the impression substantially unchanged and substantially true to the profile of the edge. The apparatus also comprises fittings to make the apparatus compatible with a profiling machine and allows the impression to be positioned in the profiling machine in substantially the same orientation every time an impression is taken.

25 Claims, 4 Drawing Sheets

METHOD AND APPARATUS FOR FIXTURED WAX AND TRACE

BACKGROUND OF THE INVENTION

Mechanical parts designed for use in severe environments are often subject to extreme mechanical stress. In critical environments, such as in aircraft engines, these parts must have a degree of reliability built into them that allows them to operate with the lowest possibility of failure. Often such mechanical parts are subject to failure due to the stress at particularly highly stressed locations within the parts. Anything that tends to concentrate stress in one location or another can give rise to failure.

In particular, sharp breaks, such as edges or corners formed when a tool cuts through a piece of material, sharp bends in a material, or surface irregularities can all cause stress to concentrate causing susceptibility to failure. Edges created in the machining of parts can act as concentrators of stress if the edges are not properly finished. Edges are particularly vulnerable to undesirable stress concentration when the edge occurs in an area where high stress is already present.

One way to minimize stress concentrators, also known as stress risers, is to carefully finish surfaces eliminating burrs and scratches. In the example of an edge, finishing the at risk edge very smoothly and replacing the sharp break of the edge with a radiused edge, multi-axis machined edge, or other edge treatment having known and specifically chosen characteristics can serve to retard the concentration of stress. Once a surface has been appropriately treated, it is critical to measure the results of the treatment and to critique the treated surface for adherence to engineering specifications.

Historically, edges have been measured by a variety of methods. Prominent among these is a method called wax-and-trace. This method relies on an operator to apply an impressionable material, such as a heated wax, to the desired part feature by hand, allow the wax to cool, and remove the wax, all the time positioning and holding the wax by hand. All this is to be done without distorting the profile of the impression. The removed impression in the wax is then visually aligned in a profiling machine often using a clay mount and trying to ensure that the direction at which the tracing element of the profiling machine approaches the impression is normal to contour centerlines. In addition to contact or tracing methods there are numerous other methods for profiling an impression among which are optical methods, interferometric methods, acoustic methods, or other methods that may be used in profiling.

The above procedure can lead to some inaccuracies. Shortfalls include: inability to reliably locate the feature to be measured; impressionable material deformation during application, cooling, and removal; and inability to accurately align the impressionable material to the profiling machine sensors.

Accordingly, a need exists to be able to make impressions of the features of surfaces that do not suffer from the limitations of holding the impressionable material by hand and that allow repeatable and accurate placement in a profiling machine for accurate measurement of the features of surfaces.

BRIEF DESCRIPTION OF THE INVENTION

The invention relates to an apparatus for measuring surface features in machined parts comprising:
 a) a fixture to hold an impressionable material in fixed position against a surface feature for the period needed for the impressionable material to conform to the surface feature and register the shape of the surface feature;
 b) said fixture removable such that the profile created in the impressionable material remains substantially unchanged by removal; and
 c) said fixture mountable in a profiling device repeatably from measurement to measurement.

In another embodiment the invention relates to an apparatus for measuring edges in machined parts comprising:
 a) a fixture to hold an impressionable material in fixed position against an edge for the period needed for the impressionable material to conform to the edge and register the shape of the edge;
 b) said fixture having a positioning element and a measuring element;
 c) said measuring element removably fitted to said positioning element in a manner to hold said measuring element in alignment with said positioning element;
 d) said measuring element removable from said positioning element such that the profile created in the impressionable material remains substantially unchanged during removal; and
 e) said measuring element configured to be mountable in a profiling device repeatably from measurement to measurement.

In one aspect, the invention relates to a method for measuring surface features in machined parts comprising:
 a) holding an impressionable material with a fixture in fixed position against a surface feature for a period of time sufficient for the impressionable material to conform to the surface feature and register the shape of the surface feature;
 b) removing the fixture from the surface feature while maintaining the profile of the surface feature substantially unchanged by removal; and
 c) mounting the fixture in a profiling device repeatably from measurement to measurement.

In another aspect, the invention relates to a method for measuring edges in machined parts comprising:
 a) holding an impressionable material in fixed position against an edge using a fixture having a positioning element and a measuring element;
 b) holding the impressionable material in fixed position for a period of time sufficient for the impressionable material to conform to the edge and register the shape of the edge;
 c) holding the measuring element in alignment with the positioning element, the measuring element being removably fitted to the positioning element;
 d) removing the measuring element from the positioning element while maintaining the profile created in the impressionable material substantially unchanged during removal; and
 e) configuring the measuring element to be mountable in a profiling device repeatably from measurement to measurement.

DETAILED DESCRIPTION OF THE INVENTION

The invention is applicable to a range of industrial processes where it is desirable to form impressions of surface features. The invention comprises an apparatus for forming such impressions using impressionable material and removing the impression of the feature so that it remains substantially unchanged. The fixture for doing this can also be configured to mount on a profiling machine in a manner that ensures accurate positioning from measurement to measurement.

The invention is an improvement in the art by which many features, such as surface irregularities, sharp breaks, and edges are measured. While edge measurements are a good example of this improvement in the art, they are only one example of many. The method and apparatus are applicable to any surface feature of a part.

The apparatus comprises a fixture which can be removed once an impression of the desired surface is formed. The fixture can then be placed in a profiling machine to measure the characteristics of the edge profile impressed in the impressionable material.

In another embodiment, the apparatus can be comprised of a plurality of elements, each accurately registered to the others to maintain the integrity of the impression taken, with at least one element removable for profiling the surface feature in a profiling machine.

Figure 1:
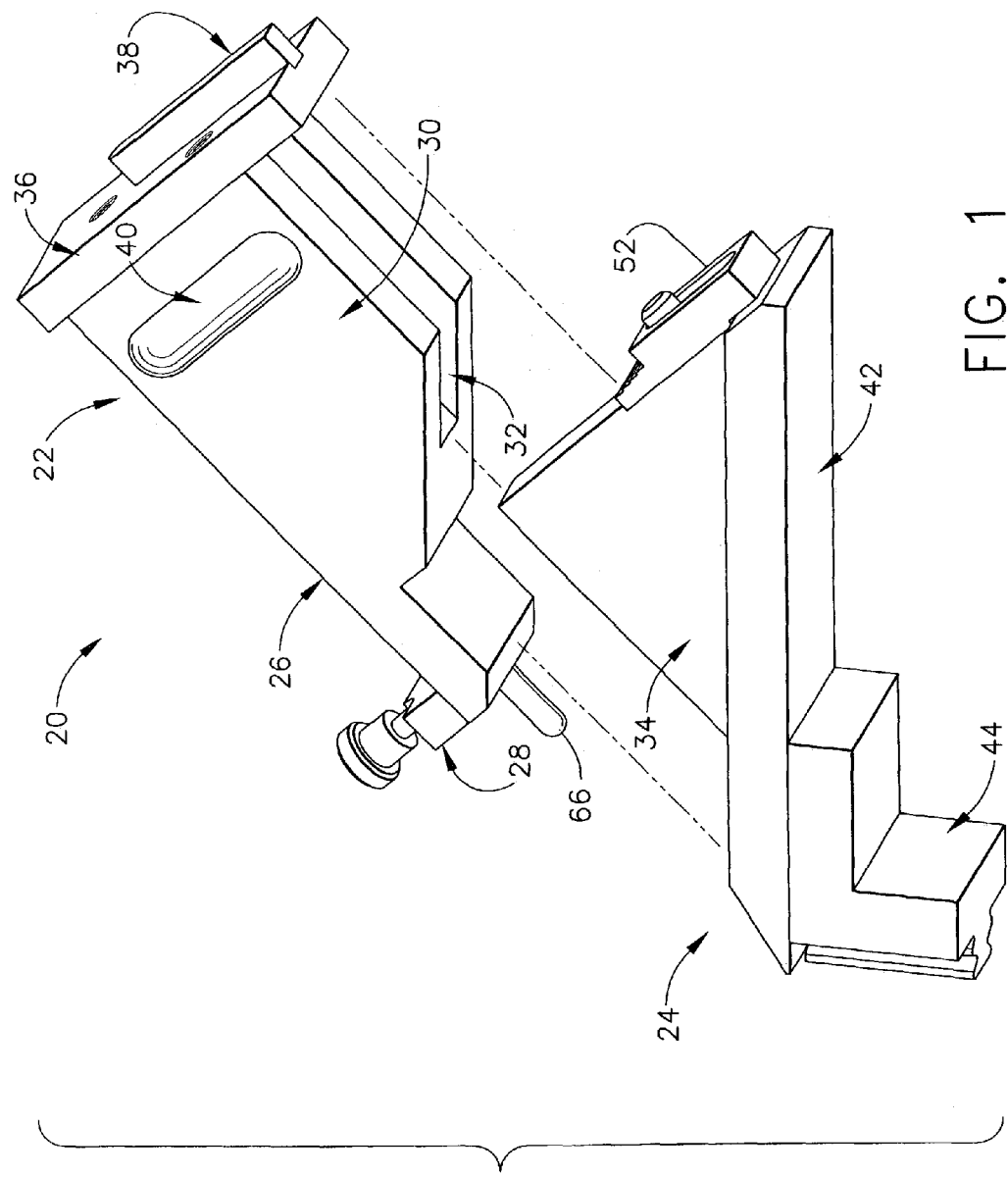
FIG. 1 is a view of the apparatus according to one embodiment of the invention.

Referring to the drawings, FIG. 1 shows a view of one embodiment of the apparatus 20 comprising: a measuring element 22 and a positioning element 24.

The measuring element 22 is comprised of a "V" block 26 for holding a cylinder of impressionable wax 66 with a hold down 28 for maintaining the position of the wax cylinder 66 for the measurement.

An alignment slide 30 is under "V" block 26 which has a keyway 32 machined in a "U" shape to closely fit an alignment insert 34 and maintain a substantially constant orientation between the positioning element 24 and the measuring element 22 when they are placed together. The alignment slide 30 also has a hand grip 40 to provide a hand hold for the withdrawal of the wax impression from the surface feature being measured. At the end of the measuring element 22, opposite the hold down 28, is a profiling plate 36 for supporting the measuring element 22 on a profiling machine. The profiling plate 36 further comprises a profiling key 38 for mounting the measuring element 22 on a profiling machine utilizing the profiling plate 36 and the profiling key 38 to position the measuring element 22 in substantially the same position, repeatably, every time the measuring element 22 is mounted on a profiling machine. Because the location on the profiling machine is repeatable from measurement to measurement, the measuring element 22 is said to be repeatably mounted on the profiling machine.

At the end opposite the hold down 28 of the assembled apparatus 20, mounted on the alignment insert 34 is a stepped gage block 52. When the apparatus 20 is assembled, the stepped gage block 52 engages the profiling plate 36 to regulate the closeness of approach of the hold down 28 end of the "V" block 26 to the part being measured. The stepped gage block 52 adjusts the depth of the impression.

The positioning element 24 comprises the alignment insert 34 fitted for holding the positioning element 24 and the measuring element 22 in alignment when they are placed together. The positioning element 24 further comprises a positioning base plate 42, which supports the alignment insert 34. The positioning base plate 42 is mounted on a part registration plate 44.

Figure 2:
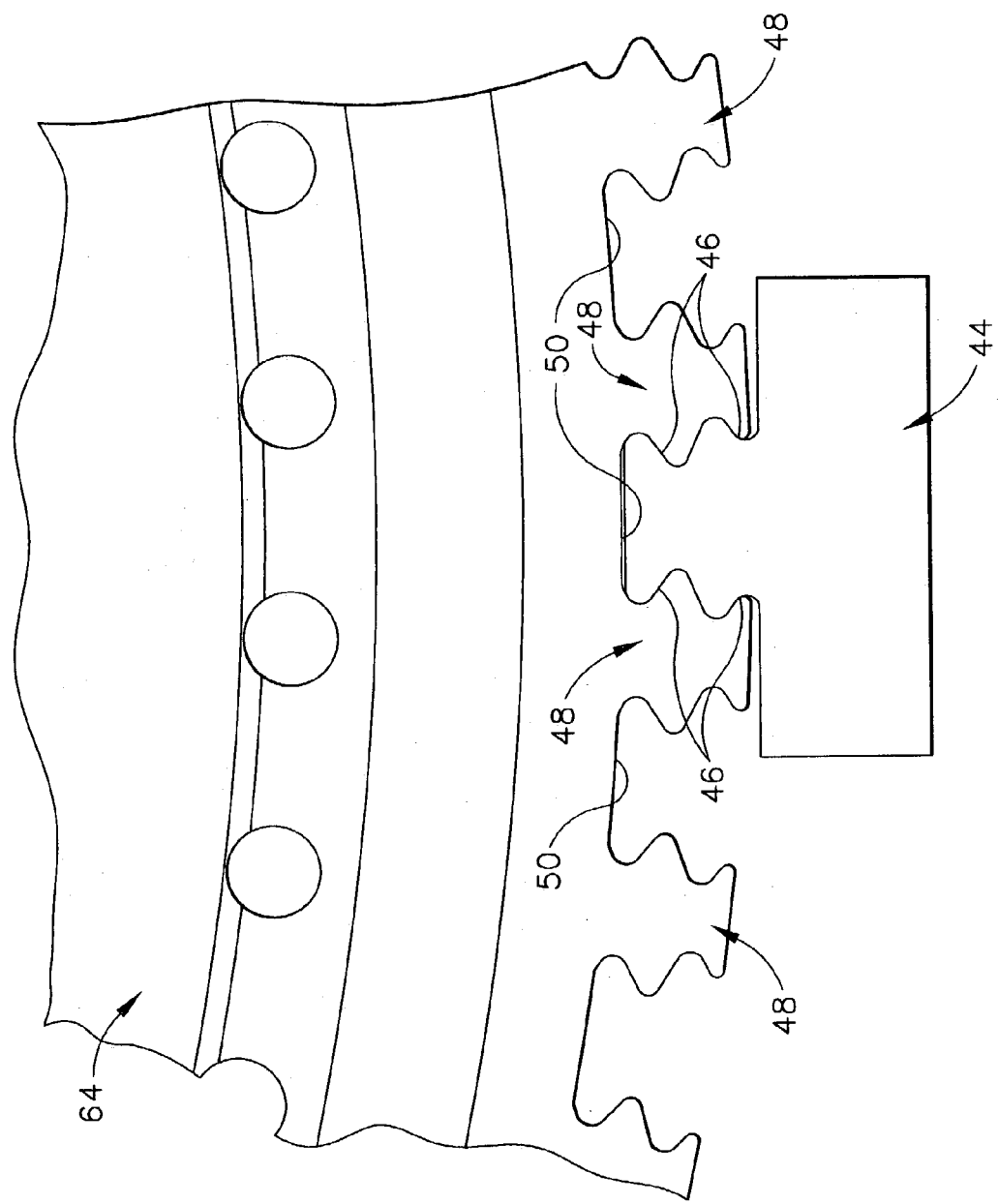
FIG. 2 is a part registration plate in position on a part to be measured.

Referring to FIG. 2, the part registration plate 44 is specifically fitted to maintain the position of the assembled apparatus 20 by referencing to specific well defined and measured locations on the part being measured. Each well defined and measured location is called a datum 46. The datums 46 allow reproducibility of apparatus 20 location from measurement to measurement and from part to part.

FIG. 2 shows the part registration plate 44 of FIG. 1 formed to contact the datums 46 identified on the dovetails 48 of an aircraft engine turbine disk 64. In this embodiment, the area of the aircraft engine turbine disk 64 between the dovetails 48 called a bottom 50 is subject to high stress and the edges of the aircraft engine turbine disk 64 there must be controlled. Impressions of the edges of the aircraft engine turbine disk 64 are made in the bottoms 50 and are profiled for edge control. The part registration plate 44 is fitted so that it contacts the datums 46 of the part such that the part registration plate 44 is always in the same position with respect to the datums 46 of the dovetails 48 when it is moved among the dovetails 48.

Figure 3:
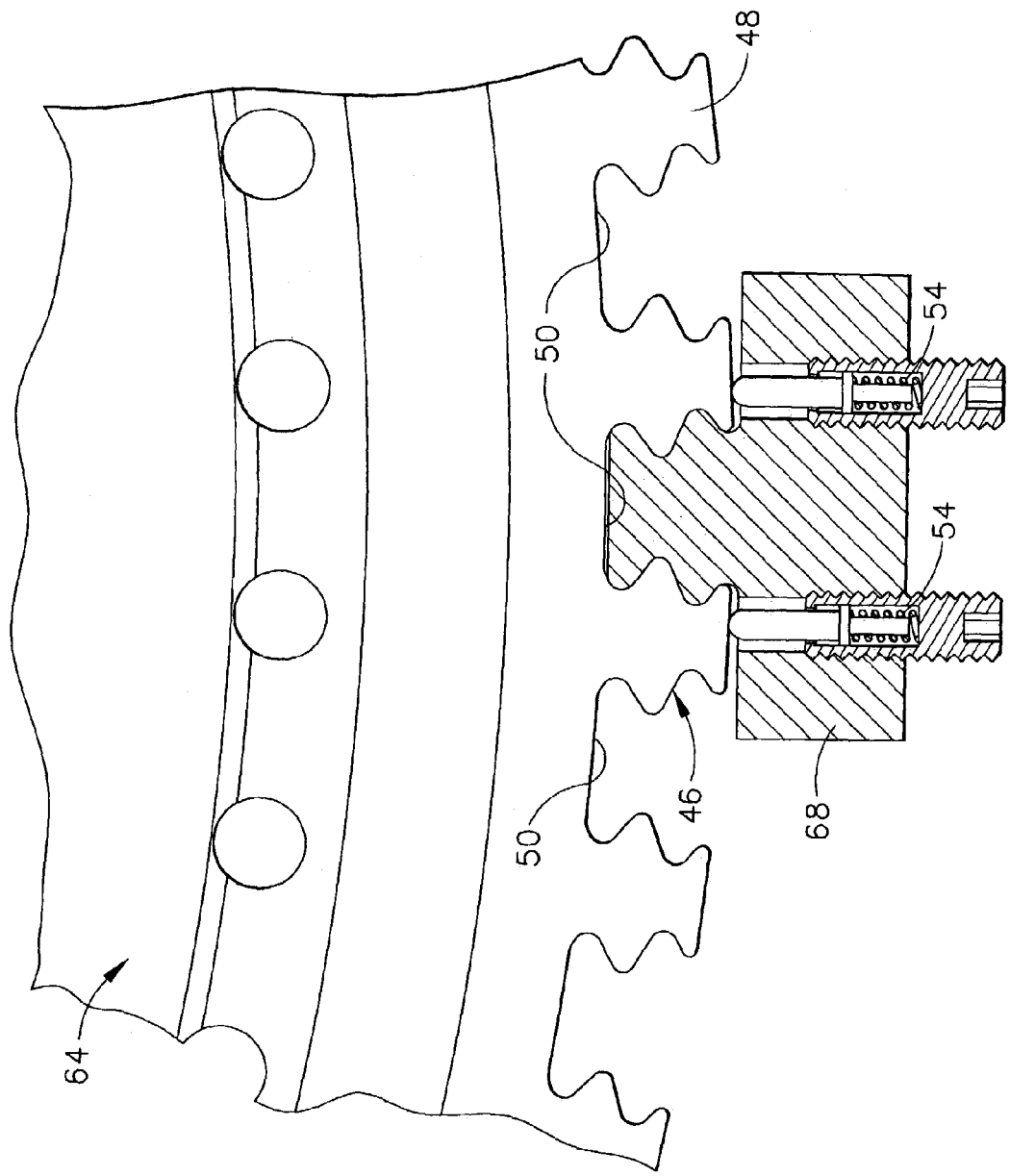
FIG. 3 is a spring loaded part registration plate mounted on a part to be measured.

FIG. 3 shows another embodiment in which the part registration plate 44 of FIG. 1 and FIG. 2 is modified to incorporate springs 54. The springs 54 position this spring loaded part registration plate 68 of FIG. 3 against the datums 46. In this way the apparatus 20 is held steady while the impression is made.

Figure 4:
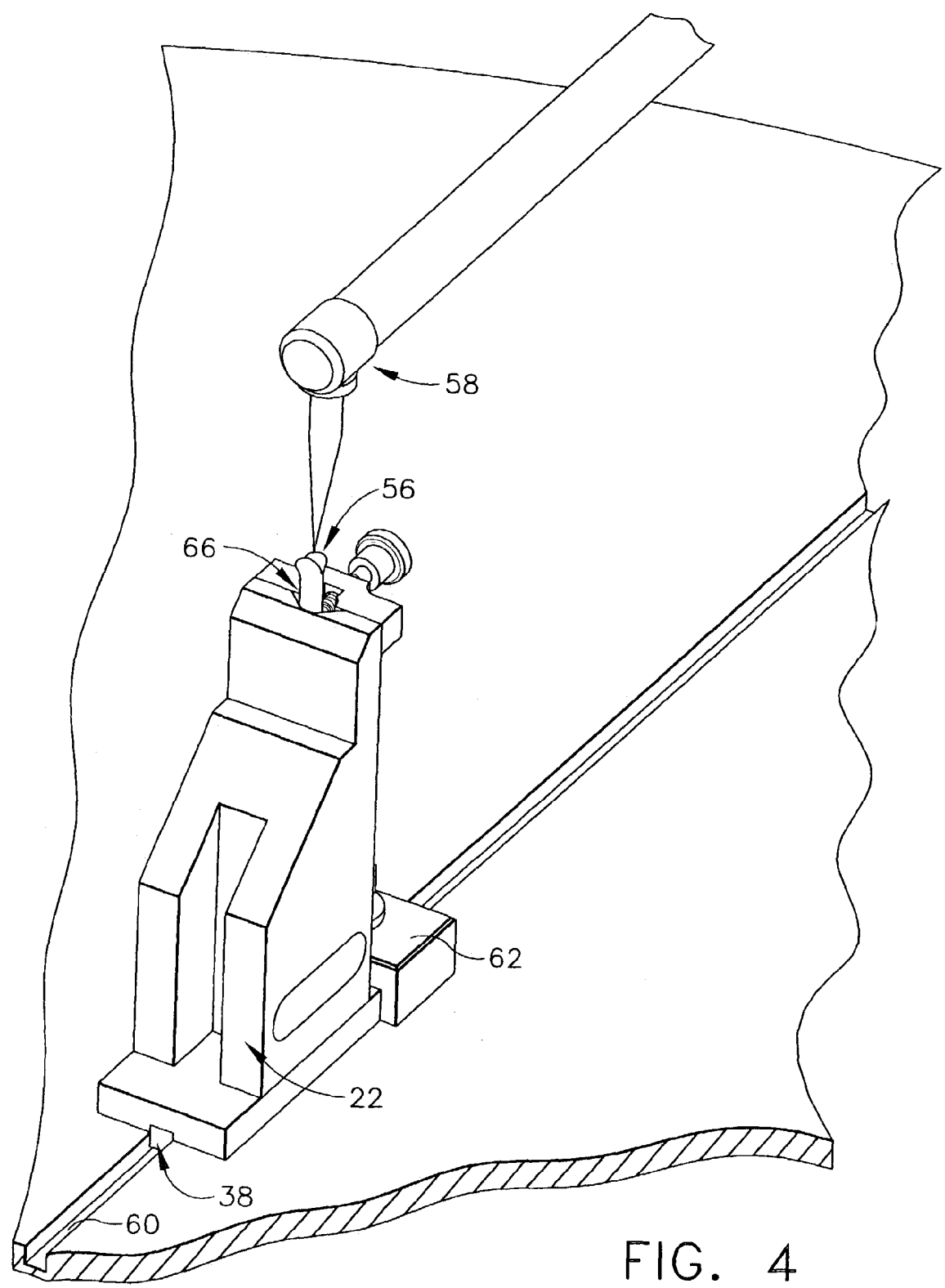
FIG. 4 is a wax impression mounted on a profiling machine being profiled.

FIG. 4 shows an impression 56 being measured by a profiling machine head 58. The profiling head 58 contacts the impression 56 to create a profile of the impression 56, and the measuring element 22 is positioned by the key 38 in the profile machine keyway 60 and by a stop block 62 which positions the measuring element 22 at the same point along the profiling machine keyway 60 every time a new impression 56 is profiled.

In using one embodiment of the apparatus 20 of FIG. 1, the positioning element 24 is first positioned on the part with the part registration plate 44 aligned by the datums 46. The measuring element 22 is positioned on the positioning element 24 with the profiling plate 36 resting on a step of the stepped gage block 52 that is about one centimeter above the alignment insert 34. The wax cylinder 66 is then slid down the "V" block 26 until it contacts the surface feature to be measured, and the hold down 28 is used to secure the wax cylinder 66 in place. The measuring element 22 is removed and the end of the wax cylinder 66 is heated to plasticity. While the wax is still plastic, the measuring element 22 is placed back on the positioning element, and the stepped gage block 52 is disengaged allowing the surface feature to penetrate into the soft wax by about one centimeter ensuring a consistent amount of penetration from measurement to measurement. The apparatus 20 then remains in place until the softened wax has hardened becoming solid. The measuring element 22 is then carefully withdrawn along the alignment insert 34 keeping everything in alignment as the solidified impression 56 departs the feature maintaining the impression substantially unchanged. The measuring element 22 is then placed on the profile machine with the profiling key 38 in the profile machine keyway 60 and the stop block 62 aligning the measuring element 22 and the impression 56 under the profiling head 58. The profiling head can then measure the profile of the impression 56.

This invention has been explained with respect to the details, arrangements of components, and certain specific embodiments shown in the accompanying drawings. These embodiments can be modified by those skilled in the art without departing from the spirit and scope of this invention. The appended claims are intended to be interpreted to cover apparatus and methods that do not depart from the spirit and scope of this invention.

We claim:

1. An apparatus for measuring surface features in machined parts comprising:
    a) a fixture to hold an impressionable material in place in fixed position against a surface feature maintaining a substantially constant orientation for the period needed for the impressionable material to conform to the surface feature and register the shape of the surface feature;
    b) said fixture removable such that the profile created in the impressionable material remains substantially unchanged by removal; and
    c) said fixture mountable in a profiling device repeatably from measurement to measurement.

2. The apparatus of claim 1 wherein said fixture is further comprised of a positioning element and a measuring element:
    a) said positioning element locating features on parts to be measured by reference to at least one datum for each measurement location;
    b) said measuring element being removably fitted to said positioning element to hold said measuring element in alignment with said positioning element; and
    c) said measuring element removable from said positioning element and configured to be mountable in a profiling device repeatably from measurement to measurement.

3. The apparatus of claim 2 wherein said measuring element has a free axis of movement such that the impressionable material may be moved toward or away from the surface feature being profiled.

4. The apparatus of claim 3 further comprising an adjustable stepped gage block to regulate the position of the impressionable material in relation to the surface feature being measured.

5. The apparatus of claim 1 wherein said fixture contacts at least one datum of the part being measured to provide reference location.

6. The apparatus of claim 2 wherein said positioning element contacts at least one datum of the part being measured to provide reference location.

7. The apparatus of claim 1 wherein said fixture is fitted to hold said positioning element in contact with at least one datum of the part being measured to provide reference location.

8. The apparatus of claim 2 wherein said positioning element is fitted to hold said positioning element in contact with at least one datum surface of the part being measured to provide reference location.

9. The apparatus of claim 1 wherein said fixture is spring loaded to hold said fixture in contact with at least one datum surface of the part being measured to provide reference location.

10. The apparatus of claim 2 wherein said positioning element is spring loaded to hold said positioning element in contact with at least one datum surface of the part being measured to provide reference location.

11. The apparatus of claim 1 wherein the impressionable material is supplied in cylindrical form and is positioned in a V-shaped block which is a part of said fixture.

12. The apparatus of claim 2 wherein the impressionable material is supplied in cylindrical form and is positioned in a V-shaped block which is a part of said measuring element.

13. The apparatus of claim 1 wherein the impressionable material is a wax.

14. The apparatus of claim 2 wherein the impressionable material is a wax.

15. An apparatus for measuring edges in machined parts comprising:
    a) a fixture to hold an impressionable material in place in fixed position against an edge maintaining a substantially constant orientation for the period needed for the impressionable material to conform to the edge and register the shape of the edge;
    b) said fixture having a positioning element and a measuring element;
    c) said measuring element removably fitted to said positioning element in a manner to hold said measuring element in alignment with said positioning element;
    d) said measuring element removable from said positioning element such that the profile created in the impressionable material remains substantially unchanged during removal; and
    e) said measuring element configured to be mountable in a profiling device repeatably from measurement to measurement.

16. The apparatus of claim 15 wherein said measuring element has a free axis of movement such that the impressionable material may be moved toward or away from the edge being profiled.

17. The apparatus of claim 16 further comprising an adjustable stepped gage block to regulate the position of the impressionable material in relation to the edge being measured.

18. A method for measuring surface features in machined parts comprising:
    a) holding an impressionable material with a fixture in place in fixed position against a surface feature maintaining a substantially constant orientation for a period of time sufficient for the impressionable material to conform to the surface feature and register the shape of the surface feature;
    b) removing the fixture from the surface feature while maintaining the profile of the surface feature substantially unchanged by removal; and
    c) mounting the fixture in a profiling device repeatably from measurement to measurement.

19. The method of claim 18 comprising using a stepped gage block to regulate the position of the impressionable material in relation to the surface feature being measured.

20. The method of claim 18 comprising using at least one datum of the part being measured to provide reference location.

21. The method of claim 18 comprising using a spring loaded fixture to hold the fixture in contact with at least one datum surface of the part being measured to provide reference location.

22. A method for measuring edges in machined parts comprising:
    a) holding an impressionable material in place in fixed position against an edge maintaining a substantially constant orientation using a fixture having a positioning element and a measuring element;

b) holding the impressionable material in fixed position for a period of time sufficient for the impressionable material to conform to the edge and register the shape of the edge;

c) holding the measuring element in alignment with the positioning element, the measuring element being removably fitted to the positioning element;

d) removing the measuring element from the positioning element while maintaining the profile created in the impressionable material substantially unchanged during removal; and e) configuring the measuring element to be mountable in a profiling device repeatably from measurement to measurement.

23. The method of claim 22 comprising using a stepped gage block to regulate the position of the impressionable material in relation to the surface feature being measured.

24. The method of claim 22 comprising using at least one datum of the part being measured to provide reference location.

25. The method of claim 22 comprising using a spring loaded part registration plate to hold the positioning element in contact with at least one datum of the part being measured to provide reference location.

* * * * *